US012762646B2

(12) United States Patent
Kim et al.

(10) Patent No.: US 12,762,646 B2
(45) Date of Patent: Oct. 13, 2026

(54) DISPLAY APPARATUS AND CONTROL METHOD THEREFOR

(71) Applicant: SAMSUNG ELECTRONICS CO., LTD., Suwon-si (KR)

(72) Inventors: Bongjoe Kim, Suwon-si (KR); Sanghun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 18/798,199

(22) Filed: Aug. 8, 2024

(65) Prior Publication Data

US 2024/0404004 A1 Dec. 5, 2024

Related U.S. Application Data

(63) Continuation of application No. PCT/KR2023/001594, filed on Feb. 3, 2023.

(30) Foreign Application Priority Data

Feb. 9, 2022 (KR) ........................ 10-2022-0016764

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 7/0002* (2013.01);
(Continued)

(58) Field of Classification Search
CPC ... G06T 3/4046; G06T 3/4053; G06T 7/0002; G06T 2207/20081; G06T 2207/20084;
(Continued)

(56) References Cited

U.S. PATENT DOCUMENTS

| | | | |
|---|---|---|---|
| 9,734,567 | B2 | 8/2017 | Zhang et al. |
| 11,100,638 | B2 | 8/2021 | Ogino et al. |

(Continued)

FOREIGN PATENT DOCUMENTS

| | | | |
|---|---|---|---|
| CN | 109376769 | A | 2/2019 |
| CN | 111368998 | A | 7/2020 |

(Continued)

OTHER PUBLICATIONS

International Search Report (PCT/ISA/210) issued on May 8, 2023 by the International Searching Authority in International Patent Application No. PCT/KR2023/001594.

(Continued)

*Primary Examiner* — David T Welch
(74) *Attorney, Agent, or Firm* — Sughrue Mion, PLLC

(57) ABSTRACT

A display apparatus, includes: a memory configured to store at least one instruction; and one or more processors configured to execute the at least one instruction to cause the display apparatus to: obtain weight value information for clusters classified according to picture quality by inputting an input image in a prediction neural network model; obtain an adaptive neural network model by respectively applying the weight value information to neural network models corresponding to the clusters; and obtain an output image with improved picture quality by inputting the input image in the adaptive neural network model, wherein the prediction neural network model is a model trained to output probability values for the clusters based on loss information for output images obtained by inputting learning images into the neural network models.

17 Claims, 10 Drawing Sheets

(51) Int. Cl.

| | |
|---|---|
| ***G06T 7/00*** | (2017.01) |
| ***G06V 10/762*** | (2022.01) |
| ***G06V 10/764*** | (2022.01) |
| ***G06V 10/774*** | (2022.01) |
| ***G06V 10/776*** | (2022.01) |
| ***G06V 10/82*** | (2022.01) |

(52) U.S. Cl.
CPC .......... *G06V 10/762* (2022.01); *G06V 10/764* (2022.01); *G06V 10/774* (2022.01); *G06V 10/776* (2022.01); *G06V 10/82* (2022.01); *G06T 2207/20081* (2013.01); *G06T 2207/20084* (2013.01); *G06T 2207/30168* (2013.01)

(58) Field of Classification Search
CPC ............ G06T 2207/30168; G06T 7/00; G06V 10/762; G06V 10/764; G06V 10/774; G06V 10/776; G06V 10/82; G06N 3/045; G06N 3/047; G06N 3/08; H04N 5/21
USPC .......................................................... 345/428
See application file for complete search history.

(56) References Cited

U.S. PATENT DOCUMENTS

| | | | | |
|---|---|---|---|---|
| 11,321,820 | B2 | 5/2022 | Lee et al. | |
| 11,900,538 | B2 * | 2/2024 | Katzman | A61C 7/08 |
| 12,217,402 | B2 * | 2/2025 | Mason | G06T 5/73 |
| 2019/0130574 | A1 * | 5/2019 | Li | G06V 10/82 |
| 2020/0250794 | A1 * | 8/2020 | Zimmer | G06T 3/4069 |
| 2021/0065337 | A1 * | 3/2021 | Bai | G06N 3/0464 |
| 2021/0104018 | A1 * | 4/2021 | Moon | G06T 3/4053 |
| 2021/0174604 | A1 * | 6/2021 | Long | G06T 19/20 |
| 2021/0334938 | A1 * | 10/2021 | Maeda | G06N 3/08 |
| 2022/0124433 | A1 * | 4/2022 | Kupryjanow | G06N 3/09 |
| 2024/0354553 | A1 * | 10/2024 | Finlay | G06N 3/0495 |

FOREIGN PATENT DOCUMENTS

| | | | |
|---|---|---|---|
| CN | 112102213 | A | 12/2020 |
| CN | 113222998 | A | 8/2021 |
| CN | 113792630 | A | 12/2021 |
| CN | 113822382 | A | 12/2021 |
| JP | 2019-25044 | A | 2/2019 |
| JP | 2021-179891 | A | 11/2021 |
| KR | 10-1465664 | B1 | 12/2014 |
| KR | 10-2019-0119550 | A | 10/2019 |
| KR | 10-2119687 | B1 | 6/2020 |
| KR | 10-2021-0052040 | A | 5/2021 |
| KR | 10-2021-0061906 | A | 5/2021 |

OTHER PUBLICATIONS

Written Opinion (PCT/ISA/237) issued on May 8, 2023 by the International Searching Authority in International Patent Application No. PCT/KR2023/001594.

* cited by examiner

DISPLAY APPARATUS AND CONTROL METHOD THEREFOR

CROSS-REFERENCE TO RELATED APPLICATION(S)

This application is a by-pass continuation application of International Application No. PCT/KR2023/001594, filed on Feb. 3, 2023, which is based on and claims priority to Korean Patent Application No. 10-2022-0016764, filed on Feb. 9, 2022, in the Korean Intellectual Property Office, the disclosures of which are incorporated by reference herein in their entireties.

BACKGROUND

1. Field

The disclosure relates to an electronic apparatus and a control method therefor, and more particularly, to a display apparatus using a plurality of neural network models and a control method therefor.

2. Description of Related Art

Display apparatuses of various types are being developed and supplied, and a method for improving a picture quality of a display apparatus are also becoming more varied.

Meanwhile, a picture quality improving neural network model based on image classification in the related art may be trained using images classified (or, labeled) subjectively by a human, and picture quality improvements to images newly input were performed using the neural network model trained based on the above.

The method above may accompany a subjective classification work, quality assessment, and the like by a human for various images, and there is difficulty in performing the subjective classification work taking into consideration all various image quality that has been rapidly developing and diversifying recently.

Accordingly, the picture quality improving neural network model based on image classification of the related art has a problem of not being appropriate for the recent technological developments. For example, there have been problems such as, an image provided by a TV being changed, performing the subjective classification work again if a learning image database is changed, and the like.

There has been a demand for a picture quality improving neural network model, which is usable without the subjective classification work by a human, and is based on images classified taking into consideration a network loss rather than a classification per image quality.

SUMMARY

Provided is a display apparatus capable of classifying an input a cluster using a neural network model corresponding to the cluster and a control method therefor.

According to an aspect of the disclosure, a display apparatus, includes: a memory configured to store at least one instruction; and one or more processors configured to execute the at least one instruction to cause the display apparatus to: obtain weight value information for a plurality of clusters classified according to picture quality by inputting an input image in a prediction neural network model; obtain an adaptive neural network model by respectively applying the weight value information to a plurality of neural network models corresponding to the plurality of clusters; and obtain an output image with improved picture quality by inputting the input image in the adaptive neural network model, wherein the prediction neural network model is a model trained to output a plurality of probability values for the plurality of clusters based on loss information for a plurality of output images obtained by inputting a plurality of learning images into the plurality of neural network models.

The one or more processors may be configured to execute the at least one instruction to cause the display apparatus to: obtain the plurality of output images by inputting the plurality of learning images into the plurality of neural network models; obtain the loss information by comparing a plurality of picture quality improved images corresponding to the plurality of learning images with the plurality of output images; and input the loss information into the prediction neural network model.

The one or more processors may be configured to execute the at least one instruction to cause the display apparatus to: obtain first loss information corresponding to a first learning image by inputting the first learning image from among the plurality of learning images; classify the first learning image into a first cluster from among the plurality of clusters based on a first loss value of less than a threshold value from among a first plurality of loss values in the first loss information; obtain second loss information corresponding to a second learning image by inputting the second learning image from among the plurality of learning images in the plurality of neural network models; and classify the second learning image into a second cluster from among the plurality of clusters based on a second loss value of less than the threshold value from among a second plurality of loss values in the second loss information.

The one or more processors may be configured to execute the at least one instruction to cause the display apparatus to: train a first neural network model corresponding to the first cluster based on a first plurality of learning images classified into the first cluster and a first picture quality improved image corresponding to the first plurality of learning images; and train a second neural network model corresponding to the second cluster based on a second plurality of learning images classified into the second cluster and a second picture quality improved image corresponding to the second plurality of learning images.

The one or more processors may be configured to execute the at least one instruction to cause the display apparatus to: obtain a third loss value corresponding to the first learning image by inputting the first learning image into the trained first neural network model; obtain a fourth loss value corresponding to the first learning image by inputting the first learning image into the trained second neural network model; re-classify the first learning image into a third cluster from among the plurality of clusters based on a fifth loss value of less than the threshold value from among the third loss value and the fourth loss value; obtain a sixth loss value corresponding to the second learning image by inputting the second learning image into the trained second neural network model; obtain a seventh loss value corresponding to the second learning image by inputting the second learning image in the trained second neural network model; re-classify the second learning image into a fourth cluster from among the plurality of clusters based on an eighth loss value of less than the threshold value from among the sixth loss value and the seventh loss value; re-train the first neural network model based on a third plurality of learning images re-classified into the first cluster and a third picture quality improved image corresponding to the third plurality of learning images; and re-train the second neural network model based on a fourth plurality of learning images re-classified into the second cluster and a fourth picture quality improved image corresponding to the fourth plurality of learning images re-classified into the second cluster.

The one or more processors may be configured to execute the at least one instruction to cause the display apparatus to: obtain a ninth loss value corresponding to the plurality of learning images by inputting the plurality of learning images into the re-trained first neural network model; obtain a tenth loss value corresponding to the plurality of learning images by inputting the plurality of learning images into the re-trained second neural network model; end training of the first neural network model based on the ninth loss value converging to the third loss value; end training of the second neural network model based on the tenth loss value converging to the fourth loss value; and train the prediction neural network model based on third loss information including the ninth loss value and the tenth loss value.

A first number of the plurality of neural network models may correspond to a second number of the plurality of clusters.

The weight value information may include the plurality of probability values, and the one or more processors may be configured to execute the at least one instruction to cause the display apparatus to obtain the adaptive neural network model by applying different weight values to the plurality of neural network models based on the plurality of probability values.

The memory may be configured to store a plurality of picture quality improved images corresponding to the plurality of learning images, and the plurality of picture quality improved images may be super resolution images.

According to an aspect of the disclosure, a control method of a display apparatus, includes: obtaining the plurality of output images by inputting the plurality of learning images into the plurality of neural network models; obtaining weight value information for a plurality of clusters classified according to picture quality by inputting an input image in a prediction neural network model; obtaining an adaptive neural network model by respectively applying the weight value information to a plurality of neural network models corresponding to the plurality of clusters; and obtaining an output image with improved picture quality by inputting the input image in the adaptive neural network model, wherein the prediction neural network model is a model trained to output a plurality of probability values for the plurality of clusters based on loss information for a plurality of output images obtained by inputting a plurality of learning images into the plurality of neural network models.

The method may further include: obtaining the loss information by comparing a plurality of picture quality improved images corresponding to the plurality of learning images with the plurality of output images; and inputting the loss information into the prediction neural network model.

The obtaining the loss information may include: obtaining first loss information corresponding to a first learning image by inputting the first learning image from among the plurality of learning images; classifying the first learning image into a first cluster from among the plurality of clusters based on a first loss value of less than a threshold value from among a first plurality of loss values in the first loss information; obtaining second loss information corresponding to a second learning image by inputting the second learning image from among the plurality of learning images in the plurality of neural network models; and classifying the second learning image into a second cluster from among the plurality of clusters based on a second loss value of less than the threshold value from among a second plurality of loss values in the second loss information.

The method may further include: training a first neural network model corresponding to the first cluster based on a first plurality of learning images classified into the first cluster and a first picture quality improved image corresponding to the first plurality of learning images; and training a second neural network model corresponding to the second cluster based on a second plurality of learning images classified into the second cluster and a second picture quality improved image corresponding to the second plurality of learning images.

The method may further include: obtaining a third loss value corresponding to the first learning image by inputting the first learning image into the trained first neural network model; obtaining a fourth loss value corresponding to the first learning image by inputting the first learning image into the trained second neural network model; re-classifying the first learning image into a third cluster from among the plurality of clusters based on a fifth loss value of less than the threshold value from among the third loss value and the fourth loss value; obtaining a sixth loss value corresponding to the second learning image by inputting the second learning image into the trained second neural network model; obtaining a seventh loss value corresponding to the second learning image by inputting the second learning image in the trained second neural network model; re-classifying the second learning image into a fourth cluster from among the plurality of clusters based on an eighth loss value of less than the threshold value from among the sixth loss value and the seventh loss value; re-training the first neural network model based on a third plurality of learning images re-classified into the first cluster and a third picture quality improved image corresponding to the third plurality of learning images; and re-training the second neural network model based on a fourth plurality of learning images re-classified into the second cluster and a fourth picture quality improved image corresponding to the fourth plurality of learning images re-classified into the second cluster.

The method may further include: obtaining a ninth loss value corresponding to the plurality of learning images by inputting the plurality of learning images into the re-trained first neural network model; obtaining a tenth loss value corresponding to the plurality of learning images by inputting the plurality of learning images into the re-trained second neural network model; ending training of the first neural network model, based on the ninth loss value converging to the third loss value; ending training of the second neural network model based on the tenth loss value converging to the fourth loss value; and training the prediction neural network model based on third loss information including the ninth loss value and the tenth loss value.

A first number of the plurality of neural network models may correspond to a second number of the plurality of clusters.

The weight value information may include the plurality of probability values, and the obtaining the adaptive neural network model may include obtaining the adaptive neural network model by applying different weight values to the plurality of neural network models based on the plurality of probability values.

The method may further include storing a plurality of picture quality improved images corresponding to the plurality of learning images, and the picture quality improved image may be a super resolution image.

DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

The disclosure will be described in detail below with reference to the accompanying drawings.

Terms used in describing embodiments of the disclosure are terms selected that are currently widely used considering their function herein. However, the terms may change depending on intention, legal or technical interpretation, emergence of new technologies, and the like of those skilled in the related art. There may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

The expression at least one from among A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When an element (e.g., a first element) is indicated as being "(operatively or communicatively) coupled with/to" or "connected to" another element (e.g., a second element), it may be understood as the element being directly coupled with/to the another element or as being coupled through other element (e.g., a third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the disclosure perform at least one function or operation, and may be implemented with a hardware or software, or implemented with a combination of hardware and software. In addition, a plurality of "modules" or a plurality of "parts", except for a "module" or a "part" which may be implemented with hardware, may be integrated in at least one module and implemented with at least one processor.

In the disclosure, the term "user" may refer to a person using an electronic apparatus or an apparatus (e.g., an artificial intelligence electronic apparatus) using the electronic apparatus.

One or more embodiments will be described in greater detail below with reference to the accompanied drawings.

Figure 1:
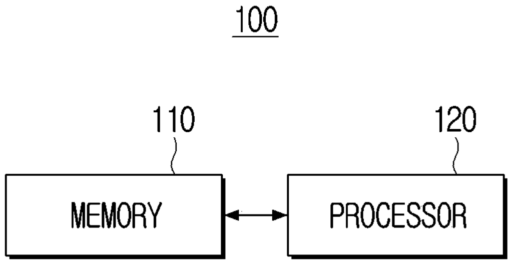
FIG. 1 is a block diagram illustrating a configuration of a display apparatus according to one or more embodiments.

FIG. 1 is a block diagram illustrating a configuration of a display apparatus according to one or more embodiments.

A display apparatus 100 according to one or more embodiments may include a memory 110 and a processor 120.

The display apparatus 100 may display video data. Here, the display apparatus 100 may be implemented as a TV, but is not limited thereto, and may be applicable without limitation so long as it is an apparatus with a display function such as, for example, and without limitation, a video wall, a large format display (LFD), a digital signage, a digital information display (DID), a projector display, and the like. In addition, display apparatus 100 may be implemented as a display of various forms such as, for example, and without limitation, a liquid crystal display (LCD), an organic light-emitting diode (OLED), a Liquid Crystal on Silicon (LCoS), a Digital Light Processing (DLP), a quantum dot (QD) display panel, quantum dot light-emitting diodes (QLED), micro light-emitting diodes (LED), a Mini LED, or the like. Meanwhile, the display apparatus 100 may be may be implemented as, for example, and without limitation, a touch screen coupled with a touch sensor, a flexible display, a rollable display, a 3D display, a display physically connected with a plurality of display modules, or the like.

The memory 110 may store data for one or more embodiments. The memory 110 may be implemented in a form of a memory embedded in the display apparatus 100 according to data storage use, or implemented in a form of a memory attachable to or detachable from the display apparatus 100. For example, data for driving of the display apparatus 100 may be stored in the memory embedded in the display apparatus 100, and data for an expansion function of the display apparatus 100 may be stored in the memory attachable to or detachable from the display apparatus 100. Meanwhile, the memory embedded in the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD)). In addition, the memory attachable to or detachable from the display apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), or a multi-media card (MMC)), an external memory (e.g., USB memory) connectable to a USB port, or the like.

The memory 110 according to an example may store at least one instruction or computer programs including instructions for controlling the display apparatus 100.

In one or more embodiments, various data has been described as being stored in an external memory 110 of the processor 120, but at least a portion from among the data described above may be stored in the memory inside of the processor 120 according to one or more embodiments from among the display apparatus 100 or the processor 120.

According to one or more embodiments, the processor 120 may be implemented as a digital signal processor (DSP) for processing a digital image signal, a microprocessor, or a time controller (TCON). However, the disclosure is not limited thereto, and may include one or more from among a central processing unit (CPU), a micro controller unit (MCU), a micro processing unit (MPU), a controller, an application processor (AP), a communication processor (CP), an ARM processor, an artificial intelligence (AI) processor, or the like, or may be defined by a relevant term. In addition, the processor 120 may be implemented with a System on Chip (SoC) or a large scale integration (LSI) in which a processing algorithm is embedded, and may be implemented in a form of a field programmable gate array (FPGA). The processor 120 may perform various functions by executing computer executable instructions stored in the memory 110.

The processor 120 according to one or more embodiments may obtain a neural network model (e.g., an adaptive neural network model) for an input image, and obtain an output image with improved picture quality by inputting the input image in the neural network model for the input image or a neural network model (hereinafter, the adaptive neural network model) optimized for the input image.

A display apparatus of the related art may divide the input image into any one cluster from among a plurality or clusters (or, a plurality of groups) according to picture quality (e.g., resolution, quality or degree of noise), and identify a neural network model corresponding to the divided cluster. The display apparatus of the related art may obtain an output image with improved picture quality by inputting the input image in the identified neural network model.

Here, the neural network model used by the display apparatus of the related art may be a model trained based on learning images which are divided into each of a plurality of clusters according to a subjective determination of a human.

For example, a neural network model corresponding to a first cluster may be trained using learning images divided as the first cluster from among the plurality of clusters according to the subjective determination of a human on picture quality and quality determination, and a neural network model corresponding to a second cluster may be trained using learning images divided as the second cluster from among the plurality of clusters according to the subjective determination of a human on picture quality and quality determination.

Here, the plurality of clusters may be classified according to picture quality. In an example, a plurality of learning images may be divided into any one cluster from among a k-number of clusters according to picture quality. For example, the plurality of learning images may be divided into any one cluster from among three clusters according to picture quality, and the first cluster may be divided to include learning images of a low picture quality (e.g., less than SD, less than 80K number of pixels, or severe noise according to the subjective determination of a human), the second cluster may be divided to include learning images of a standard picture quality (e.g., SD, VGA, less than 900K number of pixels, or normal noise according to the subjective determination of a human), and a third cluster may be divided to include learning images of a high picture quality (e.g., HD, 4K and 8K super resolutions, greater than or equal to 900K number of pixels, or weak noise according to the subjective determination of a human).

Here, the plurality of learning images being divided into any one cluster from among the three clusters is an example for convenience of description, and is not limited thereto. For example, each of the plurality of learning images may be divided into any one cluster from among six clusters according to picture quality (e.g., a degree of noise).

Meanwhile, as the number of the plurality of learning images increase exponentially, and images of ultra-high picture quality (ultra-high resolution) increase as well as a number of clusters, dividing each of the plurality of learning images into any one cluster from among the plurality of clusters according to the subjective determination of a human may be difficult or impractical, and there has been a problem of the subjective determination of a human declining in dividing accuracy and consistency.

The neural network model trained based on the learning images divided into each of the plurality of clusters according to inaccurate and inconsistent subjective determination of a human has a problem of not being appropriate for improving a picture quality of the input image.

Hereinafter, in one or more embodiments, a feature of diving the plurality of learning images and the input image into any one cluster from among the plurality of clusters without the subjective determination of a human, and a feature of obtaining an image with improved picture quality by inputting the input image in the neural network model (for example, adaptive neural network model) for the input image will be described.

Figure 2:
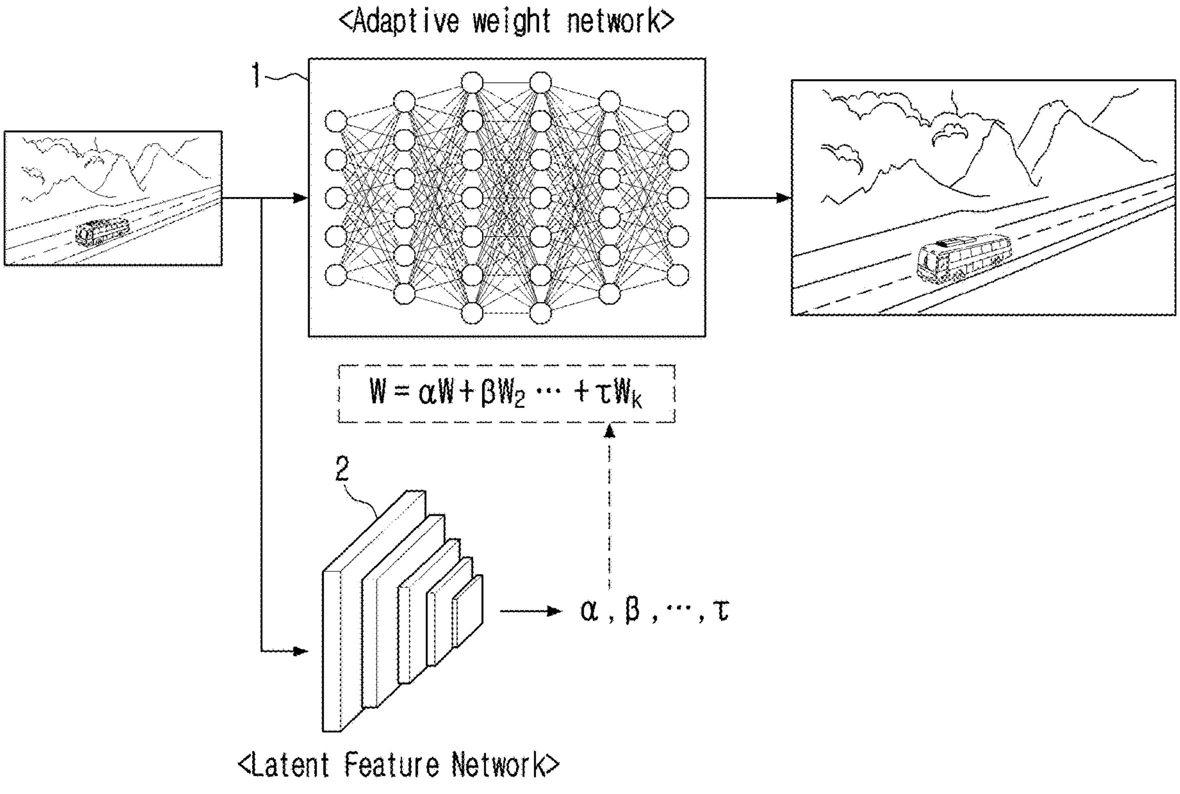
FIG. 2 is a diagram illustrating a prediction neural network model according to one or more embodiments.

FIG. 2 is a diagram illustrating a prediction neural network model according to one or more embodiments.

The processor 120 according to one or more embodiments may obtain weight value information corresponding to each of the plurality of clusters classified according to picture quality by inputting the input image in a prediction neural network model 2.

Here, the weight value information output by the prediction neural network model 2 may include a probability value for each of the plurality of clusters of the input image.

The processor 120 according to one or more embodiments may obtain an adaptive neural network model 1 by applying different weight values to each of a plurality of neural network models based on the probability value for each of the plurality of clusters included in the weight value information.

In an example, if a probability of the input image being included in the first cluster is 0.5, a probability of being included in the second cluster is 0.25, and a probability of being included in the third cluster is 0.25 according to the weight value information, the processor 120 may obtain the adaptive neural network model 1 by applying a relatively high weight value to the neural network model corresponding to the first cluster, and applying a relatively low weight value to the neural network model corresponding to the second cluster and the neural network model corresponding to the third cluster. For example, the adaptive neural network model 1 obtained by the processor 120 using the weight value information may be a model for the input image (or, corresponding to the input image).

The processor 120 may obtain the image with improved picture quality by inputting the input image in the adaptive neural network model 1.

Meanwhile, the display apparatus 100 or the memory 110 provided in the display apparatus 100 may store neural network models corresponding to each of the plurality of clusters. For example, if the input image is divided into any one cluster from among three clusters according to picture quality, the memory 110 may store a total of three neural network models corresponding to each of the three clusters.

The prediction neural network model 2 according to one or more embodiments may be a model trained to output the probability value for each of the plurality of clusters as weight value information based on loss information for a plurality of output images obtained by inputting the learning image in each of the plurality of neural network models. Detailed description for the above will be described below.

Because the prediction neural network model 2 identifies to which cluster the input image corresponds to from among the plurality of clusters or the probability value to be included in each of the plurality of clusters, the network model may be a model trained to identify an inherent (latent) feature of the input image, for example, may be referred to as a Latent Feature Network, but will be collectively referred to as the prediction neural network model 2 for convenience of description below.

Figure 3:
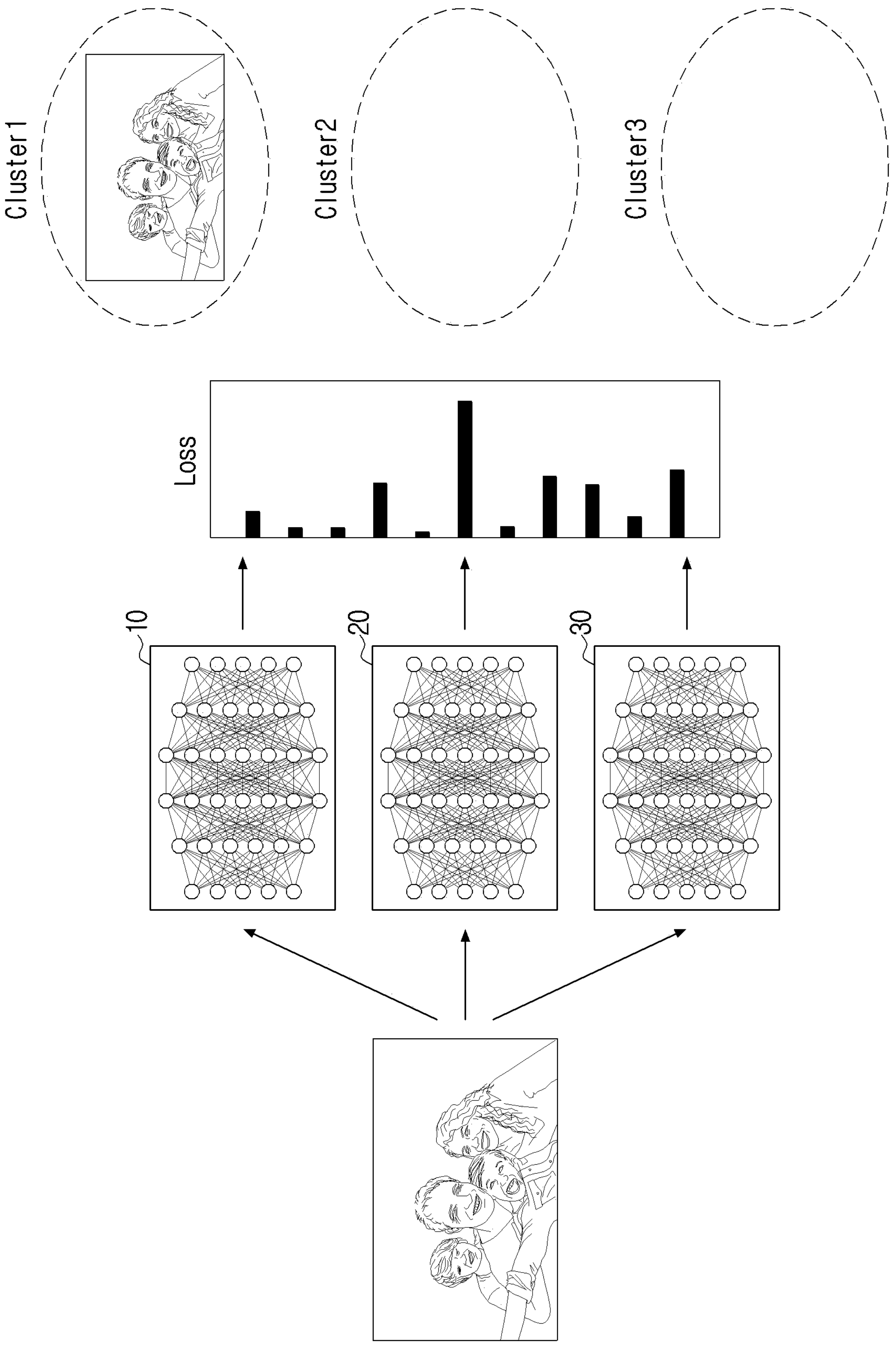
FIG. 3 is a diagram illustrating a plurality of neural network models according to one or more embodiments.

FIG. 3 is a diagram illustrating a plurality of neural network models according to one or more embodiments.

First, a training method of the neural network models corresponding to each of the plurality of clusters will be described.

Referring to FIG. 3, the processor 120 may obtain the plurality of output images corresponding to the learning image by inputting the learning image to each of the plurality of neural network models The processor 120 may obtain loss information corresponding to the plurality of output images by comparing a picture quality improved image and the plurality of output images corresponding to the learning image.

Here, the picture quality improved image corresponding to the learning image may mean a ground-truth of the learning image, and may be stored in the memory 110.

For example, among the plurality of clusters divided according to picture quality, a first neural network model 10 corresponding to the first cluster (e.g., a low picture quality cluster) may be a model for improving the picture quality of a low picture quality image, a second neural network model 20 corresponding to the second cluster (e.g., a standard picture quality cluster) may be a model for improving the picture quality of a standard picture quality image, and a third neural network model 30 corresponding to the third cluster (e.g., a high picture quality cluster) may be a model for improving the picture quality of a high picture quality image. The processor 120 may obtain the plurality of output images by inputting a first learning image in each of a first neural network model to a third neural network model 10, 20, and 30.

The processor 120 may obtain a first loss value by comparing a ground-truth of the first learning image and an image output by the first neural network model 10, obtain a second loss value by comparing the ground-truth of the first learning image and an image output by the second neural network model 20, and obtain a third loss value by comparing the ground-truth of the first learning image and an image output by the third neural network model 30. Here, loss information corresponding to the first learning image may include the first to third loss values.

The processor 120 may classify the first learning image into any one cluster (e.g., first cluster) from among the plurality of clusters based on a loss value of less than a threshold value from among a plurality of loss values included in the loss information corresponding to the first learning image.

Meanwhile, the processor 120 may input the first learning image and the loss information corresponding to the first learning image in the prediction neural network model 2, and train the prediction neural network model 2.

Figure 4:
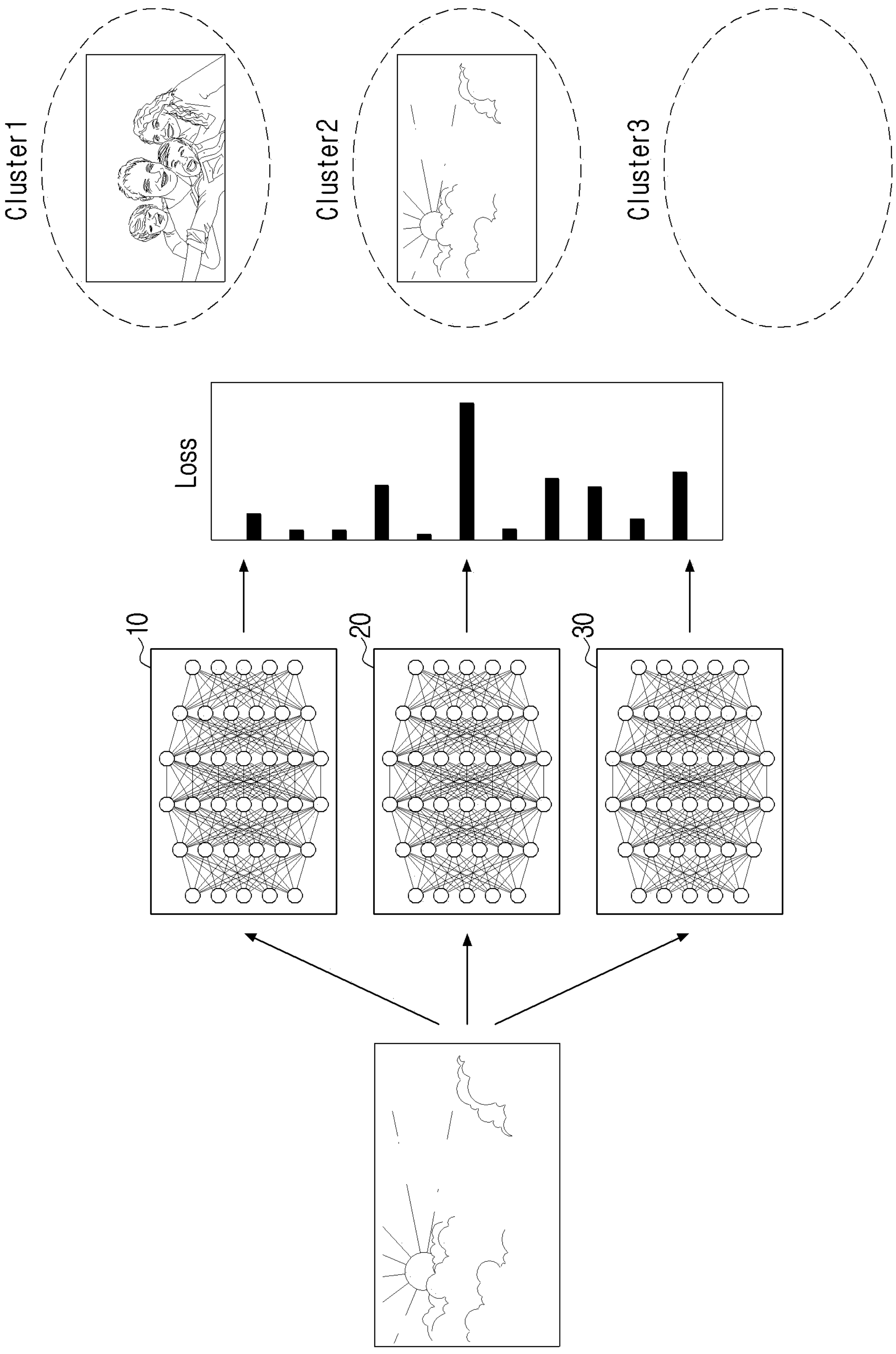
FIG. 4 is a diagram illustrating a plurality of neural network models according to one or more embodiments.

FIG. 4 is a diagram illustrating a plurality of neural network models according to one or more embodiments.

The processor 120 may obtain the plurality of output images by inputting a second learning image in each of the first neural network model to the third neural network model 10, 20, and 30.

The processor 120 may obtain the first loss value by comparing a picture quality improved image (for example, ground-truth) of the second learning image and an image output by the first neural network model 10, obtain the second loss value by comparing a ground-truth of the second learning image and an image output by the second neural network model 20, and obtain the third loss value by comparing the ground-truth of the second learning image and an image output by the third neural network model 30. Here, loss information corresponding to the second learning image may include the first to third loss values.

The processor 120 may classify the second learning image into any one cluster (e.g., second cluster) from among the plurality of clusters based on a loss value of less than the threshold value from among the plurality of loss values included in the loss information corresponding to the second learning image.

Meanwhile, the processor 120 may input the second learning image and the loss information corresponding to the second learning image to the prediction neural network model 2, and train the prediction neural network model 2.

Figure 5:
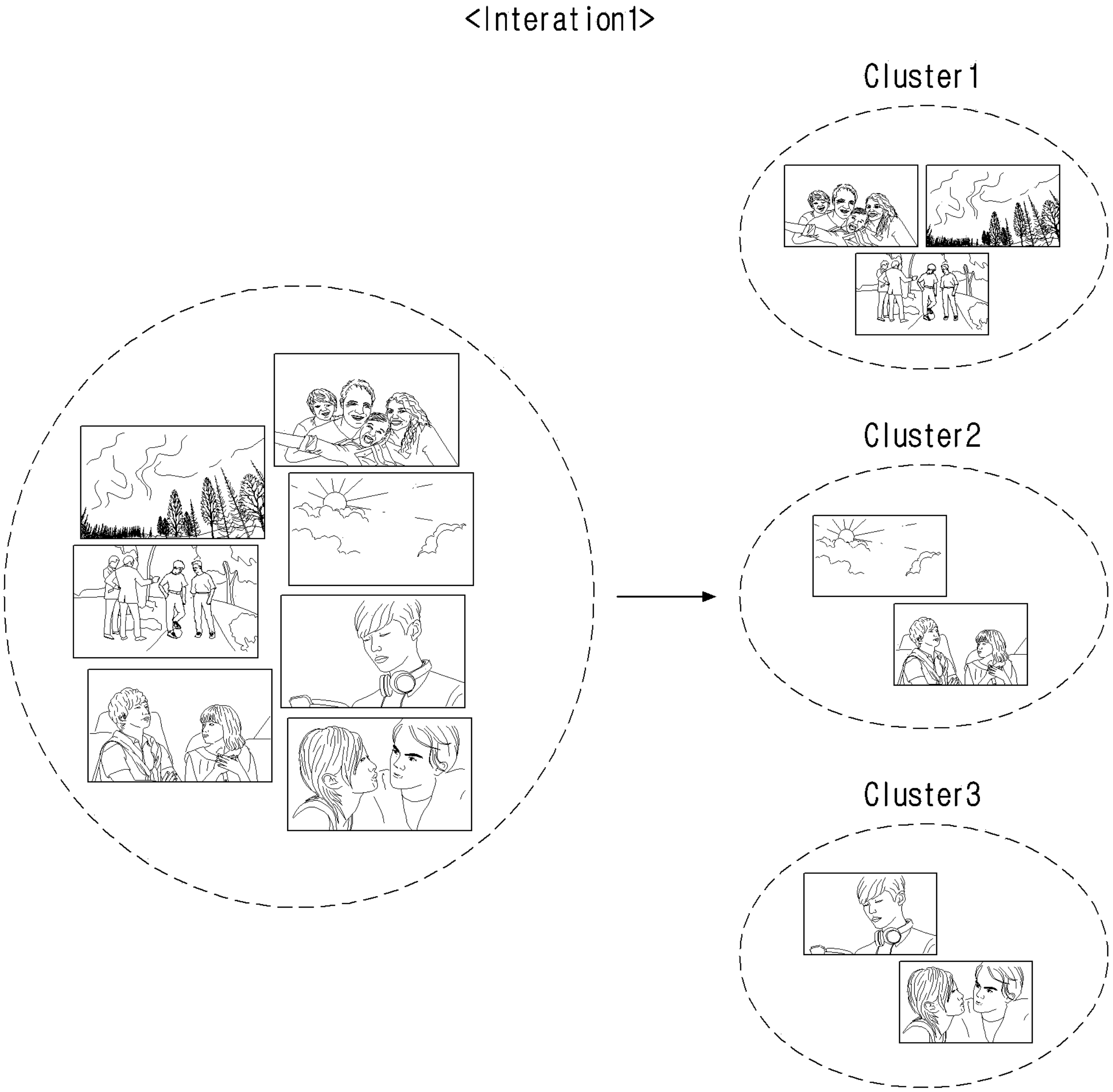
FIG. 5 is a diagram illustrating a plurality of clusters according to one or more embodiments.

FIG. 5 is a diagram illustrating a plurality of clusters according to one or more embodiments.

<Iteration 1>

Referring to FIG. 5, the processor 120 may obtain, as described in FIG. 3 and FIG. 4, loss information corresponding to each of the plurality of learning images, and classify each of the plurality of learning images into any one cluster For example, the processor 120 may input a third learning image in each of the first neural network model to the third neural network model 10, 20, and 30, identify a model that output an image with the least loss (minimal loss) as a model for the third learning image by comparing a picture quality improved image (for example, ground-truth) of the third learning image and images output by each of the first neural network model to the third neural network model 10, 20, and 30, and classify the third learning image into a cluster corresponding to a relevant model.

As described above, the processor 120 may obtain loss information corresponding to the third learning image which includes the first to third loss values by comparing the picture quality improved image (for example, ground-truth) of the third learning image and images output by each of the first neural network model to the third neural network model 10, 20, and 30. The processor 120 may train the prediction neural network model 2 by inputting the third learning image and the loss information corresponding to the third learning image in the prediction neural network model 2.

The processor 120 according to one or more embodiments may train the neural network models (e.g., first to third neural network models 10, 20, and 30) corresponding to each of the plurality of clusters based on classifying the each of the plurality of learning images into any one cluster.

Figure 6:
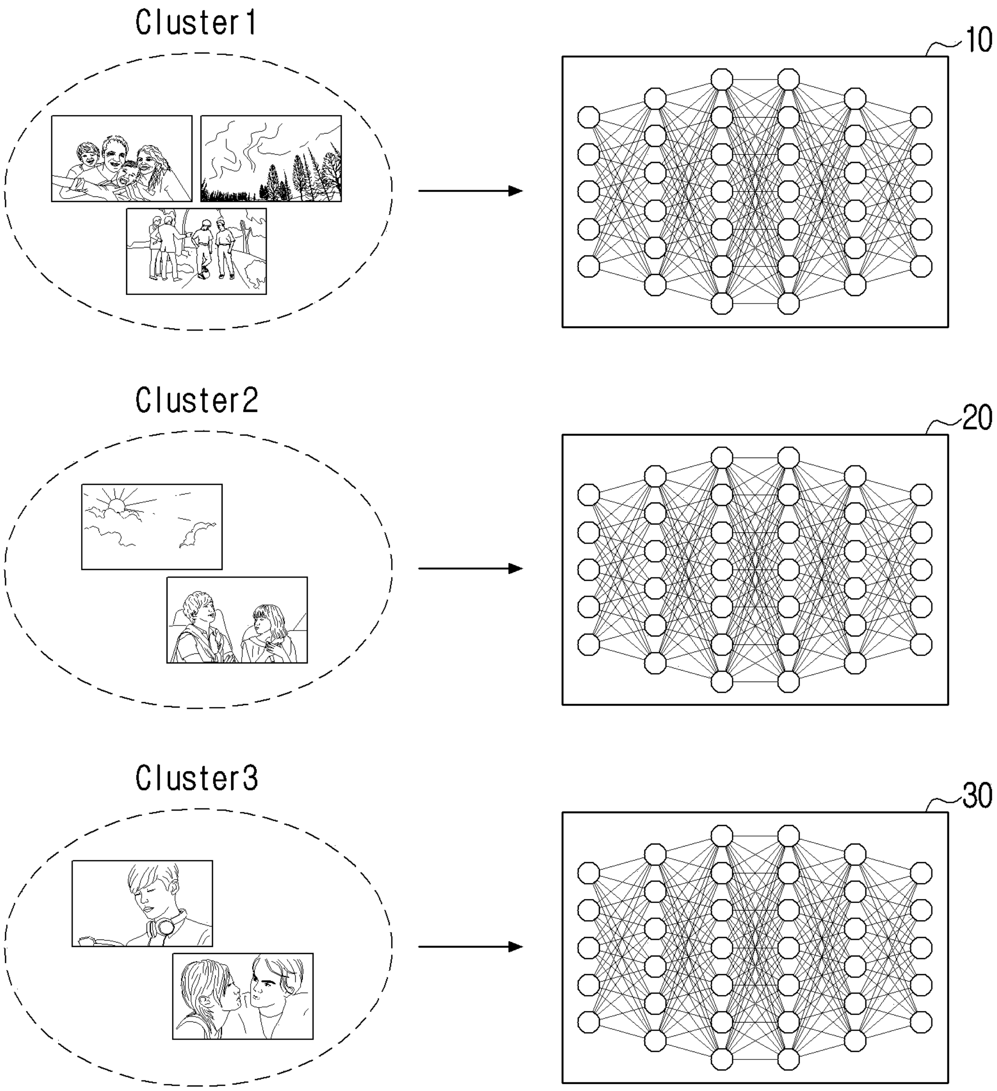
FIG. 6 is a diagram illustrating a learning of a plurality of neural network models according to one or more embodiments.

FIG. 6 is a diagram illustrating a learning of a plurality of neural network models according to one or more embodiments.

Referring to FIG. 6, the processor 120 may train the plurality of neural network models using learning images included in each of the plurality of clusters.

For example, the processor 120 may train the first neural network model 10 corresponding to the first cluster using learning images included in the first cluster from among the plurality of clusters.

In an example, in steps shown in FIG. 3 to FIG. 5, the processor 120 classified the learning images identified for picture quality improvement (e.g., with minimal loss occurrence) using the first neural network model 10 as the first cluster from among the plurality of learning images, and may train the first neural network model 10 to output a picture quality improved image using the learning images classified into the first cluster and the picture quality improved images (e.g., ground-truth) corresponding to the learning images classified into the first cluster.

In addition, the processor 120 may train the second neural network model 20 corresponding to the second cluster using learning images included in the second cluster from among the plurality of clusters and picture quality improved images corresponding thereto, and train the third neural network model 30 corresponding to the third cluster using learning images included in the third cluster and picture quality improved images corresponding thereto.

As shown in FIG. 5, the processor 120 may re-classify each of the plurality of learning images into any one from among the plurality of clusters based on training of the first to third neural network models using the plurality of learning images classified into the first to third clusters completing.

Figure 7:
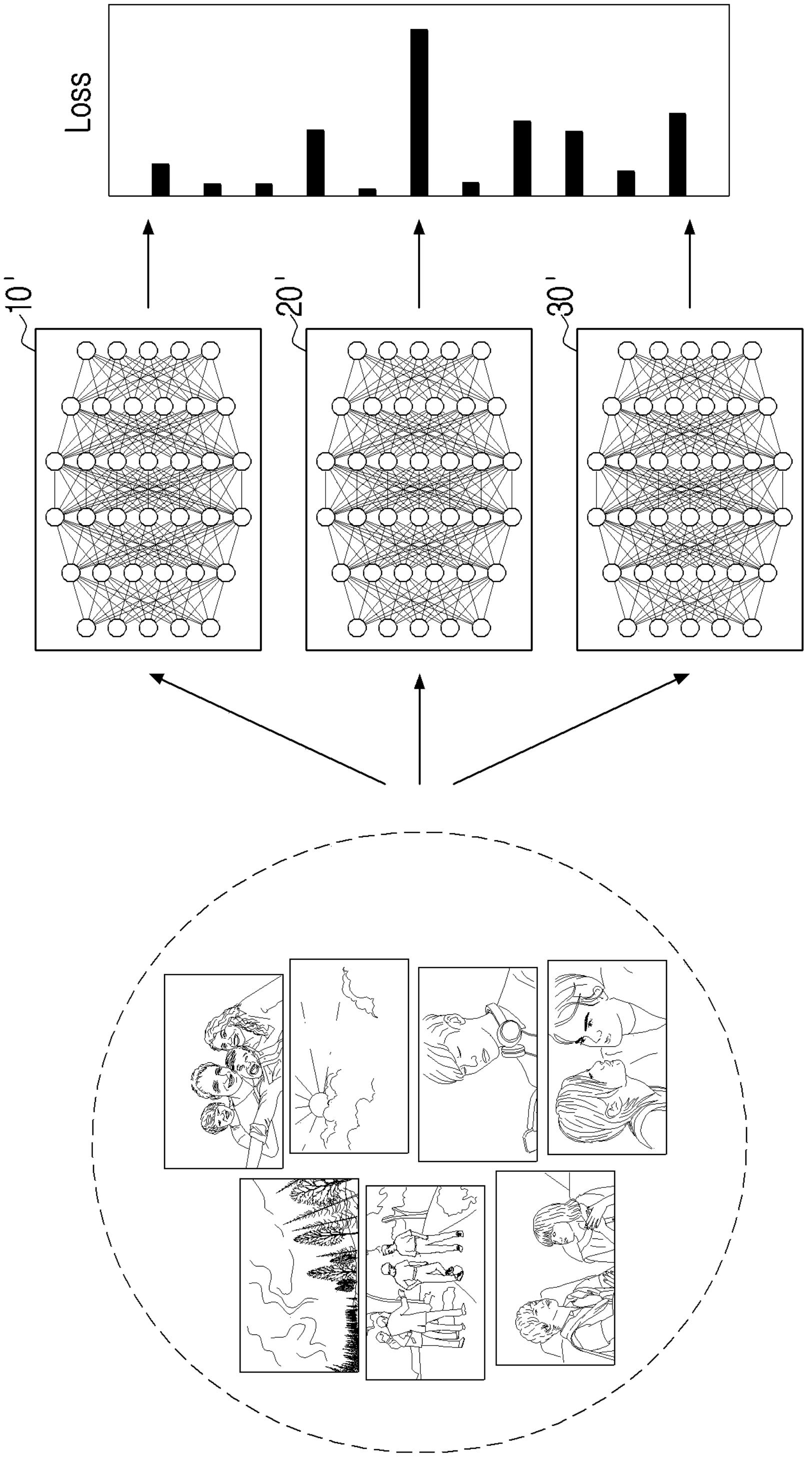
FIG. 7 is a diagram illustrating loss information according to one or more embodiments.

FIG. 7 is a diagram illustrating loss information according to one or more embodiments.

<Iteration 2>

The processor 120 may obtain loss information corresponding to each of the plurality of learning images using the plurality of neural network models trained in Iteration 1.

For example, the processor 120 may obtain an output image by inputting the first learning image from among the plurality of learning images in a first neural network model 10' trained in Iteration 1. In addition, the processor 120 may obtain an output image by inputting the first learning image in a second neural network model 20' trained in Iteration 1. In addition, the processor 120 may obtain an output image by inputting the first learning image in a third neural network model 30' trained in Iteration 1.

The processor 120 may obtain a new first loss value by comparing the ground-truth of the first learning image and an image output by the trained first neural network model 10', obtain a new second loss value by comparing the ground-truth of the first learning image and an image output by the trained second neural network model 20', and obtain a new third loss value by comparing the ground-truth of the first learning image and an image output by the trained third neural network model 30'. Here, new loss information (or, updated loss information, or re-obtained loss information, for example) corresponding to the first learning image may include the new first to third loss values.

The processor 120 may re-classify the first learning image into any one cluster from among the plurality of clusters based on a loss value of less than the threshold value from among the plurality of loss values included in the new loss information corresponding to the first learning image. Here, a cluster corresponding to the first learning image in Iteration 1 and a cluster corresponding to the first learning image in Iteration 2 may be same or may be different.

The processor 120 may obtain the loss information corresponding to each of the plurality of learning images using the plurality of neural network models trained in Iteration 1 (e.g., the trained first to third neural network models 10', 20', and 30'), and re-classify each of the plurality of learning images into any one cluster.

For example, the processor 120 may input a fourth learning image in each of the first neural network model to third neural network model 10', 20', and 30' trained in Iteration 1, identify a model that output an image with the least loss (minimal loss) as a model for the fourth learning image by comparing a picture quality improved image (for example, ground-truth) of the fourth learning image and images output by each of the first neural network model to third neural network model 10', 20', and 30' trained in Iteration 1, and re-classify the fourth learning image into a cluster corresponding to a relevant model.

As described above, a cluster corresponding to the fourth learning image in Iteration 1 and a cluster corresponding to the fourth learning image in Iteration 2 may be same or may be different.

The processor 120 may obtain new loss information (or, updated loss information) corresponding to the fourth learning image which includes the new first to third loss values by comparing the picture quality improved image (for example, ground-truth) of the fourth learning image and images output by each of the first neural network model to third neural network model 10', 20', and 30' trained in Iteration 1 (different from the first to third loss values in Iteration 1).

The processor 120 may re-train the prediction neural network model 2 by inputting the fourth learning image and the new loss information corresponding to the fourth learning image in the prediction neural network model 2.

The processor 120 according to one or more embodiments may re-train the neural network models trained in Iteration 1 (e.g., trained first to third neural network models 10', 20', and 30') corresponding to each of the plurality of clusters based on re-classifying each of the plurality of learning images into any one cluster in Iteration 2.

Figure 8:
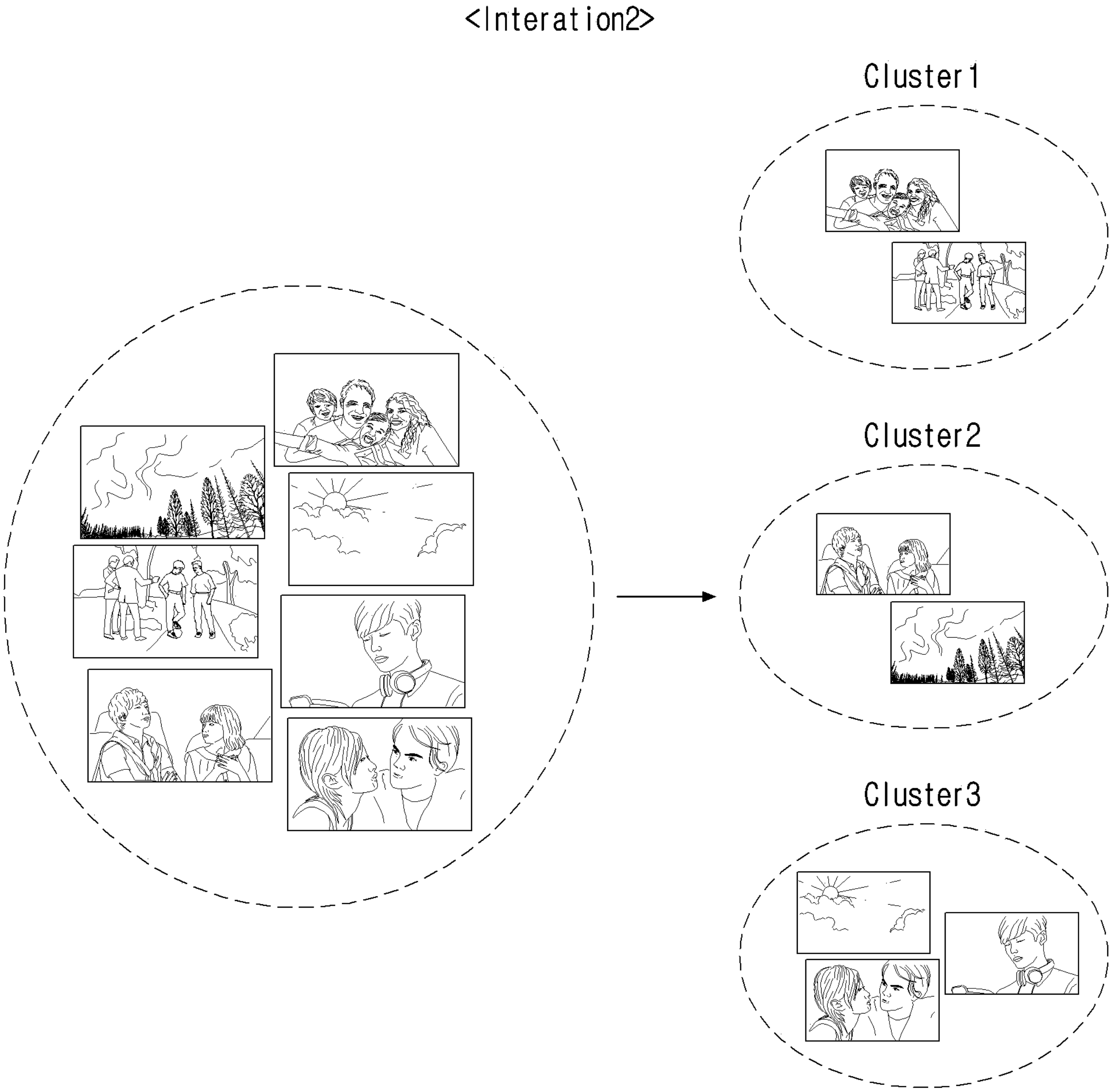
FIG. 8 is a diagram illustrating an iteration of a step according to one or more embodiments.

FIG. 8 is a diagram illustrating an iteration of a step according to one or more embodiments.

Referring to FIG. 8, the processor 120 may re-train the plurality of neural network models using the learning images included in each of the plurality of clusters. For example, the processor 120 may re-train the plurality of neural network models trained in Iteration 1 using the learning images included in each of the plurality of clusters by being re-classified in Iteration 2.

For example, the processor 120 may train the first neural network model 10 corresponding to the first cluster using the learning images included in the first cluster from among the plurality of clusters.

In an example, in a step shown in FIG. 7, the processor 120 re-classified the learning images identified for picture quality improvement (e.g., with minimal loss occurrence) using the first neural network model 10' trained in Iteration 1 as the first cluster from among the plurality of learning images, and may re-train the first neural network model 10' trained in Iteration 1 to output the picture quality improved image using the learning images reclassified into the first cluster. For example, the processor 120 may obtain a first neural network model 10" re-trained in Iteration 2.

In addition, the processor 120 may re-train the second neural network model 20' corresponding to the second cluster trained in Iteration 1 using the learning images included in the second cluster from among the plurality of clusters, and re-train the third neural network model 30' corresponding to the third cluster trained in Iteration 1 using the learning images included in the third cluster. For example, the processor 120 may obtain a second neural network model 20" and a third neural network model 30" re-trained in Iteration 2.

The processor 120 may perform Iteration 3 using a first neural network model to third neural network model 10'", 20'", and 30'" re-trained in Iteration 2.

Here, Iteration 3 may include a step of classifying each of the plurality of learning images into any one cluster, and training the neural network model corresponding to the cluster using learning images classified into the relevant cluster as described in FIG. 3 to FIG. 6.

Meanwhile, a result of having classified each of the plurality of learning images into any one cluster in Iteration n−1 and a result of having classified each of the plurality of learning images into any one cluster in Iteration n may be the same.

In this case, because learning data for training the neural network models corresponding to each of the plurality of clusters in Iteration n−1 (for example, learning images included in each of the plurality of clusters) and learning data for training the neural network models corresponding to each of the plurality of clusters in Iteration n (for example, learning images included in each of the plurality of clusters) are the same, learning results of each of the plurality of neural network models may be the same. For example, the learning results for each of the plurality of neural network models in Iteration n−1 and Iteration n may be converged.

In one or more embodiments, loss information corresponding to learning images obtained using the plurality of neural network models in Iteration n−1 and loss information corresponding to learning images obtained using the plurality of neural network models in Iteration n may be converged to the same value. The processor 120 may obtain the new first loss value corresponding to each of the plurality of learning images using the first neural network model re-trained in Iteration n, and obtain the new second loss value corresponding to each of the plurality of learning images using the second neural network model re-trained in Iteration n.

Figure 9:
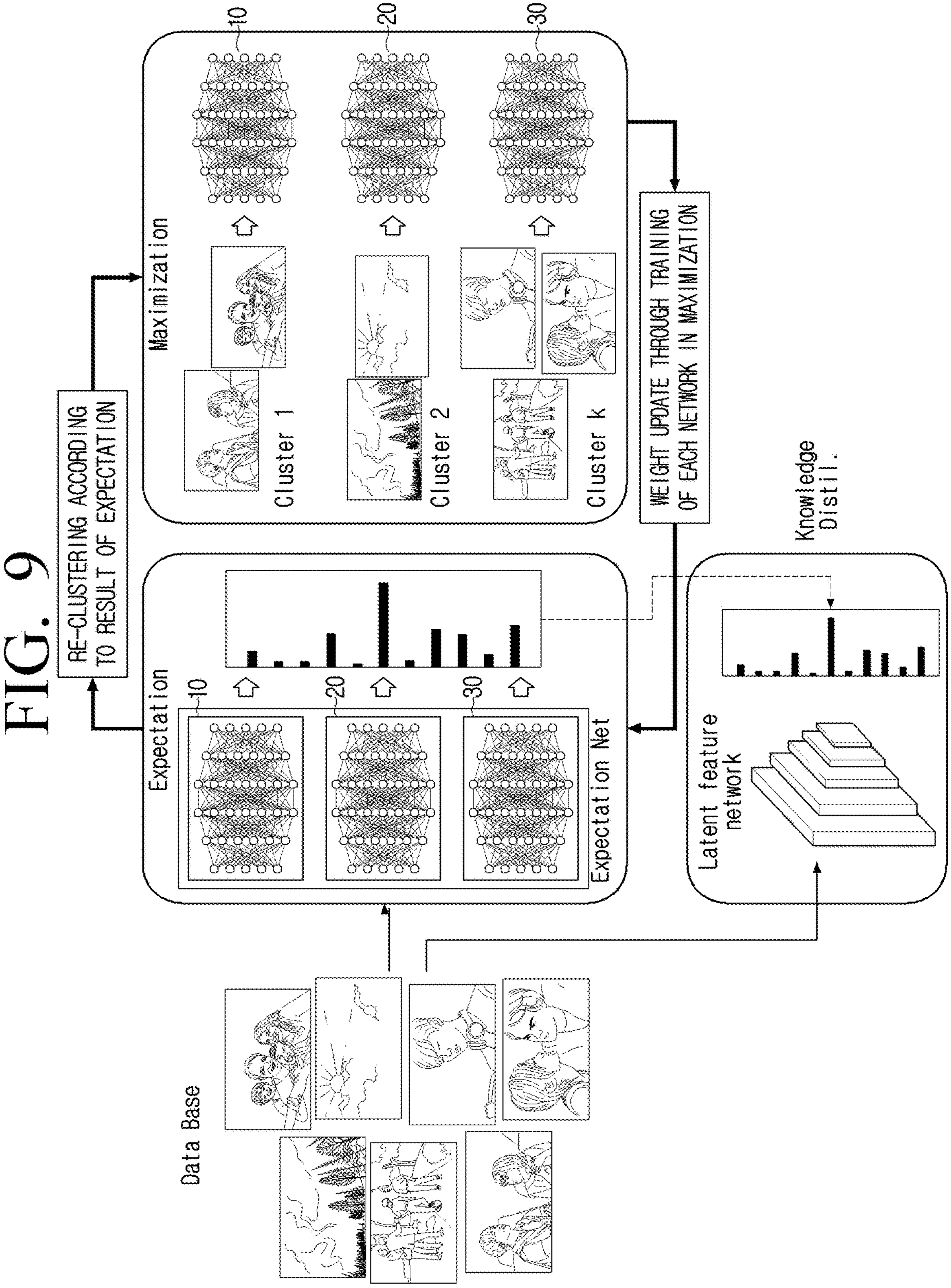
FIG. 9 is a diagram illustrating a prediction neural network model and an adaptive neural network model according to one or more embodiments.

The processor 120 may end training for each of the plurality of neural network models (for example, end Iteration) based on the previously obtained first loss value (first loss value obtained in Iteration n−1) and the new first loss value converging to the same value, and the previously obtained second loss value (second loss value obtained in Iteration n−1) and the new second loss value converging to the same value FIG. 9 is a diagram illustrating a prediction neural network model and an adaptive neural network model according to one or more embodiments.

FIG. 9 shows each step shown in FIG. 3 to FIG. 8 through one diagram.

<Expectation>

Referring to FIG. 9, the plurality of learning images (data base) may be input in the plurality of neural network models 10, 20, and 30.

Here, the first neural network model 10 from among the plurality of neural network models may correspond to the first cluster, and the second neural network model 20 may correspond to the second cluster, and the third neural network model 30 may correspond to the third cluster.

The processor 120 may obtain loss values of images output by each of the plurality of neural network models using the picture quality improved images (for example, ground-truth) for each of the plurality of learning images.

The processor 120 may classify each of the plurality of learning images into any one cluster based on loss information of each of the plurality of learning images.

<Maximization>

The processor 120 may train the first neural network model 10 corresponding to the first cluster using the learning images included in the first cluster from among the plurality of clusters.

For example, the processor 120 may train the first neural network model 10 to output a maximum picture quality improved image using the learning images included in the first cluster from among the plurality of clusters and picture quality improved images (for example, ground-truth) of each of the relevant learning images.

In addition, the processor 120 may train the second neural network model 20 corresponding to the second cluster using the learning images included in the second cluster, and train the third neural network model 30 corresponding to the third cluster using the learning images included in the third cluster.

Meanwhile, the processor 120 may perform Iteration of each step described in <Expectation> and <Maximization> several times.

For example, the processor 120 may re-perform a step of <Expectation> using the <Maximization> trained neural network models (e.g., the trained first neural network model to third neural network model 10', 20', and 30'). For example, the processor 120 may obtain loss information corresponding to each of the plurality of learning images using the <Maximization> trained neural network models, and re-classify (or, re-cluster) each of the plurality of learning images into any one cluster.

The processor 120 according to one or more embodiments may perform Iteration of each step described in <Expectation> and <Maximization> several times, and end Iteration based on each of the first to third neural network models 10, 20, and 30 converging.

The processor 120 may input loss information corresponding to each of the plurality of learning images obtained in <Expectation> in the prediction neural network model 2 (or, Latent Feature Network).

The prediction neural network model 2 may identify to which cluster the learning image corresponds to from among the plurality of clusters using the learning image and loss information corresponding to the learning image, and output the identification result.

For example, the prediction neural network model 2 may output a probability value of the learning image being included in each of the plurality of clusters. Here, the probability value for being included in each of the plurality of clusters may mean weight value information.

Here, a feature of inputting loss information corresponding to each of the plurality of learning images obtained in <Expectation> in the prediction neural network model 2 (or, Latent Feature Network), for example, a feature of a relatively large network (teacher network) transferring knowledge (e.g., output value or obtained value of the large network) to a relatively small network (student network), and the small network performing training using the knowledge received from the large network may be referred to as knowledge distillation.

Because the input image can be divided into any one cluster, or the probability value to be included in each of the plurality of clusters can be obtained using the prediction neural network model 2, a subjective determination process of a human may not be used.

The processor 120 according to one or more embodiments may input the input image in the prediction neural network model 2 if the image is input based on training for the prediction neural network model and each of the plurality of neural network models being completed.

The processor 120 may obtain the adaptive neural network model based on weight value information output by the prediction neural network model 2. For example, the processor 120 may obtain the adaptive neural network model by respectively applying weight value to the plurality of neural network models corresponding to the plurality of clusters.

The processor 120 may obtain the output image with improved picture quality by inputting the input image in the adaptive neural network model. For example, the processor 120 may obtain a noise-removed image, an up-scaled image, a texture or edge enhanced image, and the like using the adaptive neural network model.

Referring back to FIG. 1, in the disclosure, the neural network model being trained may mean a pre-defined operation rule or a neural network model set to perform a feature (or, purpose) being created as a neural network model (e.g., an artificial intelligence model including arbitrary parameters that are random) is trained by a learning algorithm using a plurality of training data. The learning may be carried out through a separate server and/or system, but is not limited thereto, and may be carried out in an electronic apparatus 100. Examples of the learning algorithm may include a supervised learning, an unsupervised learning, a semi-supervised learning, a transfer learning, or a reinforcement learning, but is not limited to the above-described examples.

Here, each of the neural network models may be implemented as, for example, a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but are not limited thereto.

The processor 120 for executing the neural network models according to one or more embodiments may be implemented through a combination of a generic-purpose processor such as the CPU, the AP, and the DSP, a graphics-dedicated processor such as a graphic processing unit (GPU) and a vision processing unit (VPU), or an artificial intelligence-dedicated processor such as a neural processing unit (NPU) and software. The processor 120 may control to process input data according to the pre-defined operation rule or the neural network model stored in the memory 110. If the processor 120 is a dedicated processor (or, the artificial intelligence-dedicated processor), the processor may be designed to a hardware structure for the processing of a neural network model. For example, the hardware for the processing of the neural network model may be designed into a hardware chip such as an application specific integrated circuit (ASIC) or the FPGA. If the processor 120 is implemented as the dedicated processor, the processor may be implemented to include a memory for implementing one or more embodiments, or implemented to include a memory processing function for using an external memory.

According to one or more embodiments, the memory 110 may store information on neural network models that include a plurality of layers. Here, the storing information on neural network model may mean storing various information associated with operations of the neural network models, for example, information on the plurality of layers included in the neural network models, information on parameters (e.g., a filter coefficient or bias) used in each of the plurality of layers, and the like.

The memory 110 may store data for the one or more embodiments. The memory 110 may be implemented in the form of the memory embedded in the electronic apparatus 100 according to a data storage use, or in the form of the memory attachable to or detachable from the electronic apparatus 100.

For example, data for the driving of the display apparatus 100 may be stored in the memory embedded in the display apparatus 100, and data for the expansion function of the display apparatus 100 may be stored in the memory attachable to or detachable from the display apparatus 100. Meanwhile, the memory embedded in the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD)). In addition, the memory attachable to or detachable from the display apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), or a multi-media card (MMC)), an external memory (e.g., USB memory) connectable to a USB port, or the like.

The memory 110 according to an example may store at least one instruction or computer programs including instructions for controlling the display apparatus 100.

According to one or more embodiments, the memory 110 may store information on neural network models that include a plurality of layers. Here, the storing information on neural network model may mean storing various information associated with operations of the neural network models, for example, information on the plurality of layers included in the neural network models, information on parameters (e.g., a filter coefficient or bias) used in each of the plurality of layers, and the like. For example, the memory 110 may store the neural network models according to one or more embodiments.

Figure 10:
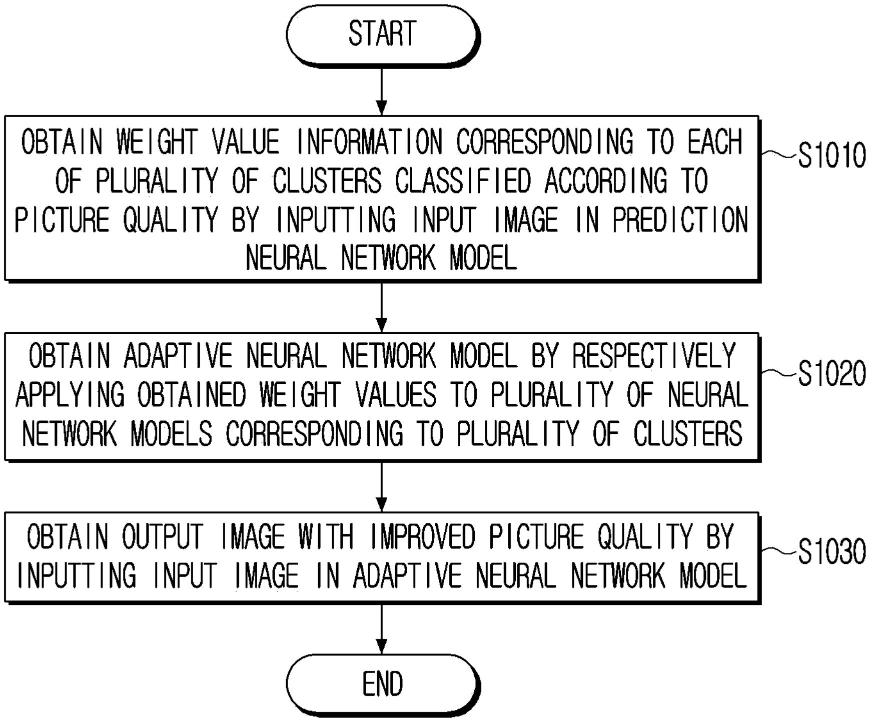
FIG. 10 is a flowchart illustrating a control method of a display apparatus according to one or more embodiments.

FIG. 10 is a flowchart illustrating a control method of a display apparatus according to one or more embodiments.

A control method of the display apparatus according to one or more embodiments may include, first, obtaining weight value information corresponding to each of the plurality of clusters classified according to picture quality by inputting the input image in the prediction neural network model (S1010).

The method may include obtaining the adaptive neural network model by respectively applying the obtained weight values to the plurality of neural network models corresponding to the plurality of clusters (S1020).

The method may include obtaining the output image with improved picture quality by inputting the input image in the adaptive neural network model (S1030).

Here, the prediction neural network model may be a model trained to output the probability values for each of the plurality of clusters based on loss information for the plurality of output images obtained by inputting the learning image in each of the plurality of neural network models.

The control method according to one or more embodiments may further include obtaining the plurality of output images corresponding to the learning image by inputting the learning image in each of the plurality of neural network models, obtaining loss information corresponding to the plurality of output images by comparing the picture quality improved image corresponding to the learning image with the plurality of output images, and inputting the obtained loss information in the prediction neural network model.

Here, the obtaining loss information may include obtaining loss information corresponding to the first learning image by inputting the first learning image from among the plurality of learning images in the plurality of neural network models, classifying the first learning image into any one cluster from among the plurality of clusters based on the loss value of less than the threshold value from among the plurality of loss values included in the loss information corresponding to the first learning image, obtaining loss information corresponding to the second learning image by inputting the second learning image from among the plurality of learning images in the plurality of neural network models, and classifying the second learning image into any one cluster from among the plurality of clusters based on the loss value of less than the threshold value from among the plurality of loss values included in the loss information corresponding to the second learning image.

The control method according to one or more embodiments may further include training the first neural network model corresponding to the first cluster based on learning images classified into the first cluster from among the plurality of clusters and the picture quality improved image corresponding to each of the learning images classified into the first cluster, and training the second neural network model corresponding to the second cluster based on learning images classified into the second cluster from among the plurality of clusters and the picture quality improved image corresponding to each of the learning images classified into the second cluster.

The control method according to one or more embodiments may include obtaining the first loss value corresponding to the first learning image by inputting the first learning image from among the plurality of learning images in the trained first neural network model, obtaining the second loss value corresponding to the first learning image by inputting the first learning image in the trained second neural network model, re-classifying the first learning image into any one cluster from among the plurality of clusters based on the loss value of less than the threshold value from among the first loss value and the second loss value corresponding to the first learning image, obtaining the first loss value corresponding to the second learning image by inputting the second learning image in the trained second neural network model, obtaining the second loss value corresponding to the second learning image by inputting the second learning image in the trained second neural network model, re-classifying the second learning image into any one cluster from among the plurality of clusters based on the loss value of less than the threshold value from among the first loss value and the second loss value corresponding to the second learning image, re-training the first neural network model corresponding to the first cluster based on learning images re-classified into the first cluster from among the plurality of clusters and the picture quality improved image corresponding to each of the learning images re-classified into the first cluster, and re-training the second neural network model corresponding to the second cluster based on learning images re-classified into the second cluster from among the plurality of clusters and the picture quality improved image corresponding to each of the learning images re-classified into the second cluster.

The control method according to one or more embodiments may include obtaining the new first loss value corresponding to each of the plurality of learning images by inputting each of the plurality of learning images in the re-train first neural network model, obtaining the new second loss value corresponding to each of the plurality of learning images by inputting each of the plurality of learning images in the re-trained second neural network model, ending, based on each of the new first loss value and the new second loss value converging to the previously obtained first loss value and the second loss value, training of the first neural network model and the second neural network model, and training the prediction neural network model based on loss information which includes the new first loss value and the new second loss value.

The number of the plurality of neural network models according to one or more embodiments may correspond to the number of the plurality of clusters.

The weight value information according to one or more embodiments may include the probability value for each of the plurality of clusters of the input image, and the obtaining an adaptive neural network model may include obtaining the adaptive neural network model by applying different weight values to each of the plurality of neural network models based on the probability value for each of the plurality of clusters.

The display apparatus according to one or more embodiments may include the picture quality improved image corresponding to each of the plurality of learning images, and the picture quality improved image may be a super resolution image.

The various embodiments may be applicable to not only the display apparatus, but also to all electronic apparatuses that include the display.

The various embodiments described above may be implemented in a recordable medium which is readable by a computer or a device similar to the computer using software, hardware, or a combination of software and hardware. One or more embodiments described herein may be implemented by the processor itself. According to a software implementation, embodiments such as the procedures and functions described herein may be implemented with separate software modules. The respective software modules may perform one or more functions and operation described herein.

Computer instructions for performing processing operations of the electronic apparatus 100 according to the various embodiments described above may be stored in a non-transitory computer-readable medium. The computer instructions stored in this non-transitory computer-readable medium may cause a device to perform a processing operation in a sound output apparatus 100 according to the above-described various embodiments when executed by a processor of the device.

The non-transitory computer-readable medium may refer to a medium that stores data semi-permanently rather than storing data for a very short time, such as a register, a cache, a memory, or the like, and is readable by a device. Examples of the non-transitory computer readable medium may include, for example, and without limitation, a compact disc (CD), a digital versatile disc (DVD), a hard disc, a Blu-ray disc, a USB, a memory card, a ROM, and the like.

While example embodiments of the disclosure have been illustrated and described above, it will be understood that the embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:
a memory configured to store at least one instruction; and
one or more processors configured to execute the at least one instruction to cause the display apparatus to:
obtain weight value information including a plurality of probability values for a plurality of clusters classified according to picture quality by inputting an input image in a prediction neural network model;
obtain an adaptive neural network model by respectively applying the weight value information as different weight values to a plurality of neural network models corresponding to the plurality of clusters such that the adaptive neural network model is generated by weighting the plurality of neural network models corresponding to the plurality of clusters rather than selecting only one neural network model from among the plurality of neural network models; and
obtain an output image with improved picture quality by inputting the input image in the adaptive neural network model,
wherein the prediction neural network model is a model trained to output a plurality of probability values for the plurality of clusters based on loss information for a plurality of output images obtained by inputting a plurality of learning images into the plurality of neural network models, the loss information being obtained by comparing a plurality of picture quality improved images corresponding to the plurality of learning images with the plurality of output images and wherein the plurality of learning images are classified into the plurality of clusters based on a loss value less than a threshold value from among a plurality of loss values included in the loss information without a subjective determination of a human.

2. The display apparatus of claim 1, wherein the one or more processors are configured to execute the at least one instruction to cause the display apparatus to:
obtain the plurality of output images by inputting the plurality of learning images into the plurality of neural network models; and
input the loss information into the prediction neural network model.

3. The display apparatus of claim 2, wherein the one or more processors are configured to execute the at least one instruction to cause the display apparatus to:
obtain first loss information corresponding to a first learning image by inputting the first learning image from among the plurality of learning images;
classify the first learning image into a first cluster from among the plurality of clusters based on a first loss value of less than a threshold value from among a first plurality of loss values in the first loss information;
obtain second loss information corresponding to a second learning image by inputting the second learning image from among the plurality of learning images in the plurality of neural network models; and
classify the second learning image into a second cluster from among the plurality of clusters based on a second loss value of less than the threshold value from among a second plurality of loss values in the second loss information.

4. The display apparatus of claim 3, wherein the one or more processors are configured to execute the at least one instruction to cause the display apparatus to:
train a first neural network model corresponding to the first cluster based on a first plurality of learning images classified into the first cluster and a first picture quality improved image corresponding to the first plurality of learning images; and
train a second neural network model corresponding to the second cluster based on a second plurality of learning images classified into the second cluster and a second picture quality improved image corresponding to the second plurality of learning images.

5. The display apparatus of claim 4, wherein the one or more processors are configured to execute the at least one instruction to cause the display apparatus to:
obtain a third loss value corresponding to the first learning image by inputting the first learning image into the trained first neural network model;
obtain a fourth loss value corresponding to the first learning image by inputting the first learning image into the trained second neural network model;
re-classify the first learning image into a third cluster from among the plurality of clusters based on a fifth loss value of less than the threshold value from among the third loss value and the fourth loss value;
obtain a sixth loss value corresponding to the second learning image by inputting the second learning image into the trained second neural network model;
obtain a seventh loss value corresponding to the second learning image by inputting the second learning image in the trained second neural network model;
re-classify the second learning image into a fourth cluster from among the plurality of clusters based on an eighth loss value of less than the threshold value from among the sixth loss value and the seventh loss value;
re-train the first neural network model based on a third plurality of learning images re-classified into the first cluster and a third picture quality improved image corresponding to the third plurality of learning images; and
re-train the second neural network model based on a fourth plurality of learning images re-classified into the second cluster and a fourth picture quality improved image corresponding to the fourth plurality of learning images re-classified into the second cluster.

6. The display apparatus of claim 5, wherein the one or more processors are configured to execute the at least one instruction to cause the display apparatus to:
obtain a ninth loss value corresponding to the plurality of learning images by inputting the plurality of learning images into the re-trained first neural network model;
obtain a tenth loss value corresponding to the plurality of learning images by inputting the plurality of learning images into the re-trained second neural network model;
end training of the first neural network model based on the ninth loss value converging to the third loss value;
end training of the second neural network model based on the tenth loss value converging to the fourth loss value; and train the prediction neural network model based on third loss information comprising the ninth loss value and the tenth loss value.

7. The display apparatus of claim 1, wherein a first number of the plurality of neural network models corresponds to a second number of the plurality of clusters.

8. The display apparatus of claim 1, wherein the memory is configured to store a plurality of picture quality improved images corresponding to the plurality of learning images, and wherein the plurality of picture quality improved images are super resolution images.

9. A control method of a display apparatus, comprising:

obtaining weight value information including a plurality of probability values for a plurality of clusters classified according to picture quality by inputting an input image in a prediction neural network model;

obtaining an adaptive neural network model by respectively applying the weight value information as different weight values to a plurality of neural network models corresponding to the plurality of clusters such that the adaptive neural network model is generated by weighting the plurality of neural network models corresponding to the plurality of clusters rather than selecting only one neural network model from among the plurality of neural network models; and obtaining an output image with improved picture quality by inputting the input image in the adaptive neural network model, wherein the prediction neural network model is a model trained to output a plurality of probability values for the plurality of clusters based on loss information for a plurality of output images obtained by inputting a plurality of learning images into the plurality of neural network models, the loss information being obtained by comparing a plurality of picture quality improved images corresponding to the plurality of learning images with the plurality of output images and wherein the plurality of learning images are classified into the plurality of clusters based on a loss value less than a threshold value from among a plurality of loss values included in the loss information without a subjective determination of a human.

10. The method of claim 9, further comprising:

obtaining the plurality of output images by inputting the plurality of learning images into the plurality of neural network models; and inputting the loss information into the prediction neural network model.

11. The method of claim 10, wherein the obtaining the loss information comprises:

obtaining first loss information corresponding to a first learning image by inputting the first learning image from among the plurality of learning images;

classifying the first learning image into a first cluster from among the plurality of clusters based on a first loss value of less than a threshold value from among a first plurality of loss values in the first loss information;

obtaining second loss information corresponding to a second learning image by inputting the second learning image from among the plurality of learning images in the plurality of neural network models; and classifying the second learning image into a second cluster from among the plurality of clusters based on a second loss value of less than the threshold value from among a second plurality of loss values in the second loss information.

12. The method of claim 11, further comprising:

training a first neural network model corresponding to the first cluster based on a first plurality of learning images classified into the first cluster and a first picture quality improved image corresponding to the first plurality of learning images; and training a second neural network model corresponding to the second cluster based on a second plurality of learning images classified into the second cluster and a second picture quality improved image corresponding to the second plurality of learning images.

13. The method of claim 12, further comprising:

obtaining a third loss value corresponding to the first learning image by inputting the first learning image into the trained first neural network model;

obtaining a fourth loss value corresponding to the first learning image by inputting the first learning image into the trained second neural network model;

re-classifying the first learning image into a third cluster from among the plurality of clusters based on a fifth loss value of less than the threshold value from among the third loss value and the fourth loss value;

obtaining a sixth loss value corresponding to the second learning image by inputting the second learning image into the trained second neural network model;

obtaining a seventh loss value corresponding to the second learning image by inputting the second learning image in the trained second neural network model;

re-classifying the second learning image into a fourth cluster from among the plurality of clusters based on an eighth loss value of less than the threshold value from among the sixth loss value and the seventh loss value;

re-training the first neural network model based on a third plurality of learning images re-classified into the first cluster and a third picture quality improved image corresponding to the third plurality of learning images; and re-training the second neural network model based on a fourth plurality of learning images re-classified into the second cluster and a fourth picture quality improved image corresponding to the fourth plurality of learning images re-classified into the second cluster.

14. The method of claim 13, further comprising:

obtaining a ninth loss value corresponding to the plurality of learning images by inputting the plurality of learning images into the re-trained first neural network model;

obtaining a tenth loss value corresponding to the plurality of learning images by inputting the plurality of learning images into the re-trained second neural network model;

ending training of the first neural network model, based on the ninth loss value converging to the third loss value;

ending training of the second neural network model based on the tenth loss value converging to the fourth loss value; and training the prediction neural network model based on third loss information comprising the ninth loss value and the tenth loss value.

15. The method of claim 9, wherein a first number of the plurality of neural network models corresponds to a second number of the plurality of clusters.

16. The method of claim 9, further comprising storing a plurality of picture quality improved images corresponding to the plurality of learning images, wherein the plurality of picture quality improved images are super resolution images.

17. A non-transitory computer readable medium having instructions stored therein, which when executed by a processor cause the processor to execute a control method of a display apparatus, the control method comprising:

obtaining weight value information including a plurality of probability values for a plurality of clusters classified according to picture quality by inputting an input image in a prediction neural network model;

obtaining an adaptive neural network model by respectively applying the weight value information as different weight values to a plurality of neural network models corresponding to the plurality of clusters such that the adaptive neural network model is generated by weighting the plurality of neural network models corresponding to the plurality of clusters rather than selecting only one neural network model from among the plurality of neural network models; and obtaining an output image with improved picture quality by inputting the input image in the adaptive neural network model, wherein the prediction neural network model is a model trained to output the plurality of probability values for the plurality of clusters based on loss information for a plurality of output images obtained by inputting a plurality of learning images into the plurality of neural network models, the loss information being obtained by comparing a plurality of picture quality improved images corresponding to the plurality of learning images with the plurality of output images and wherein the plurality of learning images are classified into the plurality of clusters based on a loss value less than a threshold value from among a plurality of loss values included in the loss information without a subjective determination of a human.

* * * * *